Figure 4:
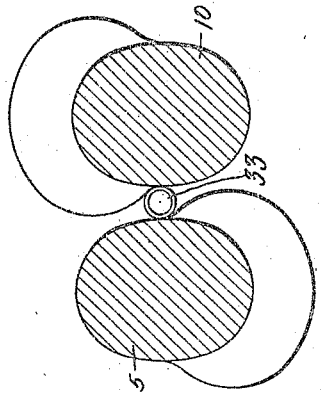

G. DUNCAN.
METHOD OF AND APPARATUS FOR REMOVING SCALE FROM PIPES.
APPLICATION FILED JUNE 12, 1915.
1,162,756.
Patented Dec. 7, 1915.
2 SHEETS—SHEET 1.
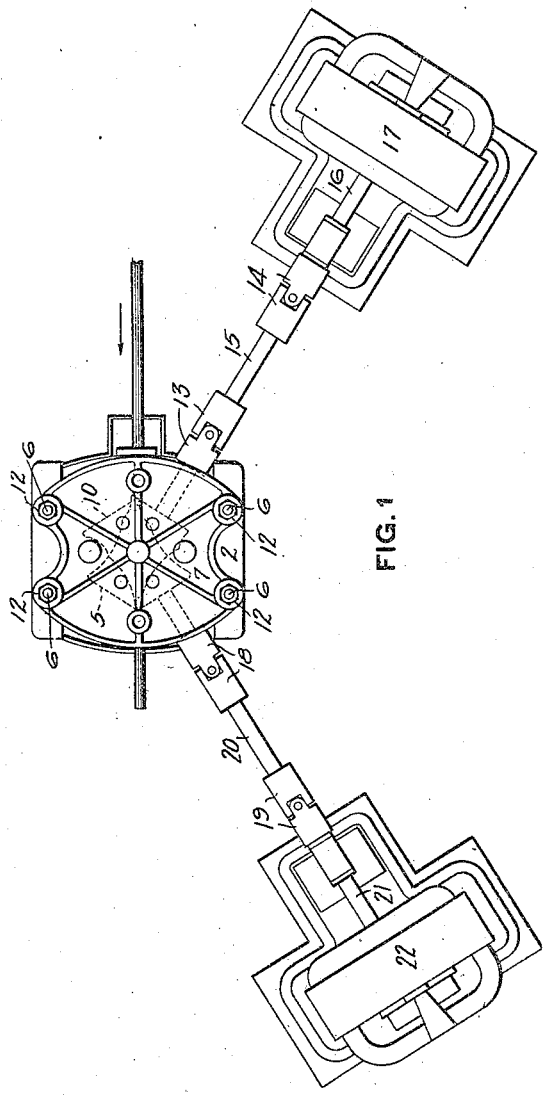
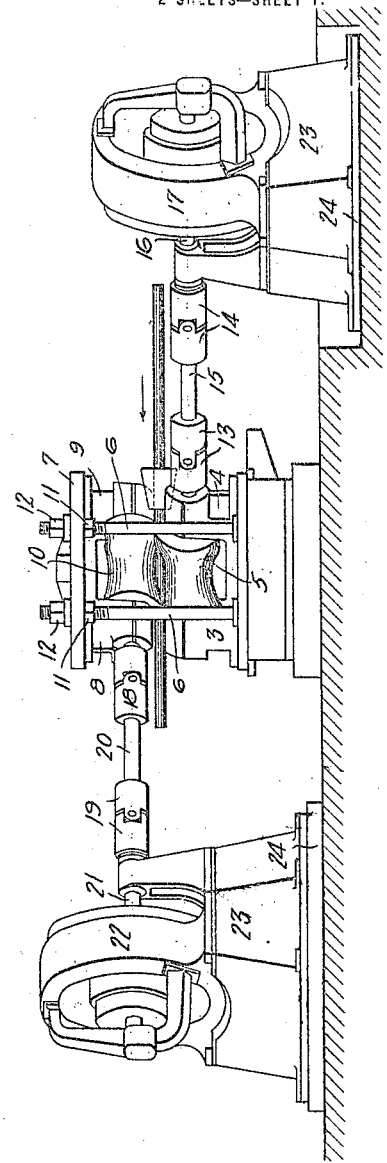
WITNESSES
INVENTOR G. DUNCAN.
METHOD OF AND APPARATUS FOR REMOVING SCALE FROM PIPES.
APPLICATION FILED JUNE 12, 1915.

1,162,756.

Patented Dec. 7, 1915.
2 SHEETS—SHEET 2.

WITNESSES

INVENTOR
George Duncan

UNITED STATES PATENT OFFICE.

GEORGE DUNCAN, OF McKEESPORT, PENNSYLVANIA, ASSIGNOR TO NATIONAL TUBE COMPANY, OF PITTSBURGH, PENNSYLVANIA, A CORPORATION OF NEW JERSEY.

METHOD OF AND APPARATUS FOR REMOVING SCALE FROM PIPES.

1,162,756.   Specification of Letters Patent.   Patented Dec. 7, 1915.

Application filed June 12, 1915. Serial No. 33,843.

*To all whom it may concern:*

Be it known that I, GEORGE DUNCAN, a citizen of the United States, and resident of McKeesport, in the county of Allegheny and State of Pennsylvania, have invented certain new and useful Improvements in Methods of and Apparatus for Removing Scale from Pipes, of which the following is a specification.

My invention relates to the removal of the scale which covers the inner and outer surfaces of butt-weld pipes or tubes at the completion of the welding operation.

In the manufacture of butt-weld pipes the pipe skelp after being heated within a welding furnace are successively drawn by means of the endless chain of a draw bench, through the welding bell on one end of the draw bench, the welding bell bending the skelp and the longitudinal edges of the skelp being forced into engagement while at a welding temperature, in the welding operation. The surfaces of the skelp become covered with scale which is fused on and tightly adheres to the surfaces of the skelp while being heated in the welding furnace, this scale remaining on the pipe, particularly on its inner surface, after the welding operation, and with the small sizes of butt weld pipes the scale on the inner surface frequently is thick enough to materially lessen the area of the opening therethrough.

Heretofore it has been the practice after welding to pass the welded pipe lengthwise through sizing rolls to fix the diameter of the pipe and then through cross straightening rolls in which any existing bends or other irregularities in the pipes are removed and the pipes are straightened. The pipes after being straightened are cooled and cut to length and are then tested and threaded.

One object of my invention is to provide a novel method whereby the scale fused on the surfaces of the butt weld pipes at the completion of the welding operation is effectively removed in the cross rolling or straightening operation without interruption in the operation of a butt weld mill, and without damage to the pipe.

Another object of my invention is to provide the cross rolls used in straightening butt weld pipes with means whereby the welded pipes passed therebetween are bent or distorted and the scale thereby removed from the surfaces thereof, and by which the distorted pipes are straightened in the passage of the pipes through the cross straightening rolls.

Still further objects of the invention will become apparent as the invention is more fully described hereinafter and is specifically pointed out in the appended claims.

My improved method preferably is carried out with apparatus such as is disclosed in the accompanying drawings wherein—

Figure 5:
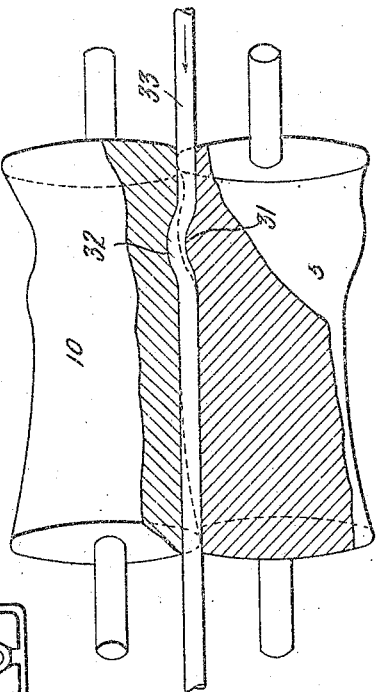
Figure 3:
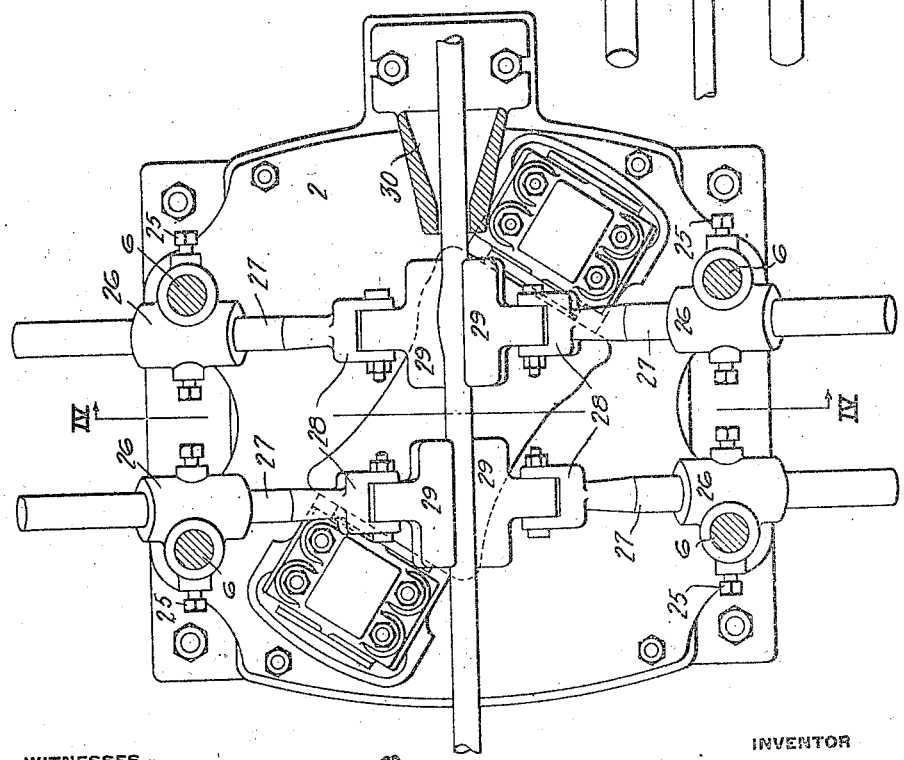

Figure 1 is a plan showing cross straightening rolls and roll driving mechanism. Fig. 2 is a side elevation of the pipe straightening apparatus shown in Fig. 1. Fig. 3 is a sectional plan of the cross rolling apparatus of Figs. 1 and 2, showing the bottom cross roll and the side guides by which the pipe is guided and conducted in its lengthwise travel through the cross rolling apparatus. Fig. 4 is a sectional end elevation of the cross rolls, the section being taken on the line IV—IV of Fig. 3. Fig. 5 is a side elevation of the cross straightening rolls, partly in section, showing the manner in which the kink or bend is put into and later removed from the pipes in distorting and straightening the pipes to remove the scale in accordance with my improved method.

Referring now to the drawings forming part of this specification, the numeral 2 designates a base which is mounted on a suitable foundation, and fastened to the base, are bearings 3 and 4 in which the bottom cross roll 5 is rotatably mounted. Secured to the base 2 by the four bolts or standards 6 is a bearing plate 7, to the lower surface of which is secured the depending bearings 8 and 9 for the top cross roll 10. The bearing plate 7 for the top bearings 8 and 9, which is adjustably secured on the screw threaded upper ends of the standards 6 is held in adjusted position by the nuts 11, 12, the adjustment being necessary to provide for a relative vertical adjustment of the top and bottom rolls 10 and 5. Rolls 5 and 10 of various sizes will be mounted in the bearings so as to enable a range in sizes of pipes to be straightened.

The end of one neck of the bottom roll 5 is connected by flexible couplings 13 and 14 and a spindle 15, to the armature shaft 16 of the roll driving motor 17, and the end of one neck of the top roll 10 is connected by universal couplings 18 and 19, and a spindle 20, with the armature shaft 21 of the roll driving motor 22. The motors are mounted on base plates 23 which in turn are secured to a suitable foundation 24, and the motor 22 for the top roll 10 is at a higher elevation than the motor 17 for the roll 5, so as to bring the armature shaft of each motor into substantially the same horizontal plane as the axis of the cross roll to which it is connected.

Adjustably secured by locking screws 25 on the standards 6 of the cross rolling mechanism are sliding sockets 26 by which the horizontal arms 27 for the guides 29 are secured in place. The arms 27, which are lengthwise adjustable in the sockets 26, have forked inner ends 28, and pivotally secured to the forked end of each guide bar is one of the guides 29 which contacts with the pipe passing between the cross rolls 5 and 10 in the pipe distorting and straightening operations. A bell-mouth guide 30 on the entrance side of the cross rolling mechanism serves to direct the entering end of the pipe between the cross rolls.

The cross rolls 5 and 10 are curved in the usual known manner, except that a peripheral hump or projection 31 is provided on the curved roll surface adjacent to the entering end of the lower cross roll 5, this hump 31 being positioned opposite a peripheral groove or depression 32 provided in the face of the upper roll 10.

In the removal of scale from welded pipes by my improved method, the pipe 33, after being drawn through the welding bell in the usual known manner, passes from the draw bench through sizing rolls and then to the cross straightening rolls 5 and 10. The surface of the pipe as it enters the pass formed between the cross rolls 5 and 10 by the curved surfaces thereof is engaged by the hump or projection on the bottom cross roll 5 and bent and forced into the registering groove 32 in the face of the top cross roll 10. The rotating cross rolls cause the pipe to revolve rapidly and these cross rolls also cause the pipe 33 to move lengthwise through the pass formed by the rolls 5 and 10 by frictional engagement with the roll surfaces.

The pivoted guides 29 prevent the pipe 33 moving sidewise from between the rolls and in this way forward movement of the rotating pipe between the rolls is insured. The reversely curved kink or bend which is formed at all points in the length of the pipe during its travel lengthwise between the rolls will crack off the tightly adhering fused scale on the pipe surfaces, and by contact with the balance of the length of the cross rolls the bent pipe is straightened and the kinks or bends removed, while it will be found that all of the scale has been removed from both the inner and outer surfaces of the pipe.

The advantages of my invention will be apparent to those skilled in the art. By changing the cross straightening rolls forming the equipment of existing butt weld mills in the manner shown, provision is made for the rapid and effective removal of the fused scale heretofore invariably found on the surfaces of butt weld pipe after the welding and straightening operations.

By means of my improved method the butt weld pipes are subjected to bending or distortion immediately after the welding and sizing operations, and the distortions in the pipe are removed as rapidly as formed during its passage through the cross straightening rolls, so as to entirely remove the fused scale, while the pipes are still heated from the welding operation to a temperature which prevents damage to the weld in the pipes.

By making pipes in accordance with my improved method with the novel apparatus shown, the operation of the butt weld mill is not interrupted, while the fused scale will be entirely removed therefrom.

Modifications in the construction and arrangement of the mechanism may be made without departing from my invention as defined in the appended claims.

I claim:—

1. The method of removing scale from butt weld pipes which consists in distorting the pipes in the pipe straightening operation and simultaneously removing the distortions from lengthwise different portions of said pipe in its passage through the cross straightening rolls.

2. The method of removing scale from a butt weld pipe which consists in distorting one portion thereof in the pipe straightening operation and simultaneously straightening another portion thereof in its passage through the cross straightening rolls to thereby remove the scale and remove the distortions made in the scale removing operations.

3. Apparatus for straightening welded pipes comprising cross straightening rolls and means for positively rotating said rolls, the pipe engaging surfaces of said rolls having a peripheral enlargement in the surface of one roll and a depression in the surface of the other roll opposite said enlargement.

4. Apparatus for straightening welded pipes comprising cross straightening rolls and means for positively rotating said rolls, the pipe engaging surfaces of said rolls having a peripheral enlargement in the surface of one roll and a depression in the surface of the other roll opposite said enlargement, said enlargement and depression being adjacent to the entrance end of the pass formed by said straightening rolls.

Signed at McKeesport, Penna. this 26 day of May, 1915.

GEORGE DUNCAN.

Witnesses:
JAS. P. DAVIS,
WILLIAM J. KIRKLAND.